US012802997B2

(12) United States Patent
Li et al.

(10) Patent No.: US 12,802,997 B2
(45) Date of Patent: Nov. 17, 2026

(54) DISPERSING AGENT FOR CATHODE SLURRY OF LITHIUM ION BATTERY AND PREPARATION METHOD AND APPLICATION THEREFOR

(71) Applicant: JIANGSU YITE NEW MATERIAL CO., LTD, Changzhou (CN)

(72) Inventors: Wenlong Li, Changzhou (CN); Yonghe Wang, Changzhou (CN); Jiandong Chen, Changzhou (CN); Wengang Qi, Changzhou (CN)

(73) Assignee: JIANGSU YITE NEW MATERIAL CO., LTD, Changzhou (CN)

( * ) Notice: Subject to any disclaimer, the term of this patent is extended or adjusted under 35 U.S.C. 154(b) by 723 days.

(21) Appl. No.: 18/302,823

(22) Filed: Apr. 19, 2023

(65) Prior Publication Data

US 2023/0299297 A1 Sep. 21, 2023

(30) Foreign Application Priority Data

Apr. 26, 2022 (CN) ......................... 202210441969.7

(51) Int. Cl.

*H01M 4/62* (2006.01)
*H01M 4/02* (2006.01)
(Continued)

(52) U.S. Cl.

CPC ......... *H01M 4/623* (2013.01); *H01M 4/5825* (2013.01); *H01M 4/625* (2013.01); *H01M 10/0525* (2013.01); *H01M 2004/028* (2013.01)

(58) Field of Classification Search

CPC .... H01M 4/623; H01M 4/5825; H01M 4/625; H01M 10/0525; H01M 2004/028;
(Continued)

(56) References Cited

U.S. PATENT DOCUMENTS

2018/0047988 A1* 2/2018 Seuring .................. C08L 65/00
2020/0067085 A1* 2/2020 Chae .................... H01M 4/139
(Continued)

FOREIGN PATENT DOCUMENTS

CN 113611917 A * 11/2021 .......... H01M 4/5825

OTHER PUBLICATIONS

CN-113611917-A Translation (Year: 2021).*
(Continued)

*Primary Examiner* — Matthew T Martin
*Assistant Examiner* — Kevin Song
(74) *Attorney, Agent, or Firm* — CBM PATENT CONSULTING, LLC

(57) ABSTRACT

A cathode slurry of a lithium ion battery, comprising the following ingredients in parts by weight: 50 to 80 parts of solvent, 5 to 9 parts of secondary assistant, 10 to 40 parts of main dispersing agent, and 0.1 to 3 parts of pH value regulator; a dispersing agent is added into the cathode slurry of the lithium ion battery, so that a dispersity of a solid material in the cathode slurry is improved, and a viscosity of the slurry is reduced due to a good dispersity; when coating is carried out with the same viscosity, the cathode slurry added with the dispersing agent is used as a high-solid-content slurry, and multiple experiments show that, when a dispersing agent effective matter accounting for 0.3% of a total solid amount is added, a solid content is increased by 2% to 3% under the same viscosity.

8 Claims, 1 Drawing Sheet

(51) Int. Cl.
*H01M 4/58* (2010.01)
*H01M 10/0525* (2010.01)

(58) Field of Classification Search
CPC ......... H01M 4/62; H01M 4/628; Y02E 60/10; Y02P 70/50
See application file for complete search history.

(56) References Cited

U.S. PATENT DOCUMENTS

| | | | | |
|---|---|---|---|---|
| 2020/0335794 | A1* | 10/2020 | Kim .................. | H01M 10/0525 |
| 2021/0098785 | A1* | 4/2021 | Kim ...................... | H01M 4/622 |

OTHER PUBLICATIONS

"Products." Hexing Black Li-Series, www.jzhxci.com/product1.php?lm=41&id=43. Accessed Apr. 17, 2026. (Year: 2026).*
"Zheflon®FL2032 PVDF-Lithium Battery Binder Grade: PVDF: Zheflon PVDF & Flurine FKM Manufacturer." M.Flurine.Com, m.flurine.com/pid18300828/Zheflon-FL2032-PVDF-Lithium-battery-binder-grade.htm. Accessed Apr. 17, 2026. (Year: 2026).*

* cited by examiner

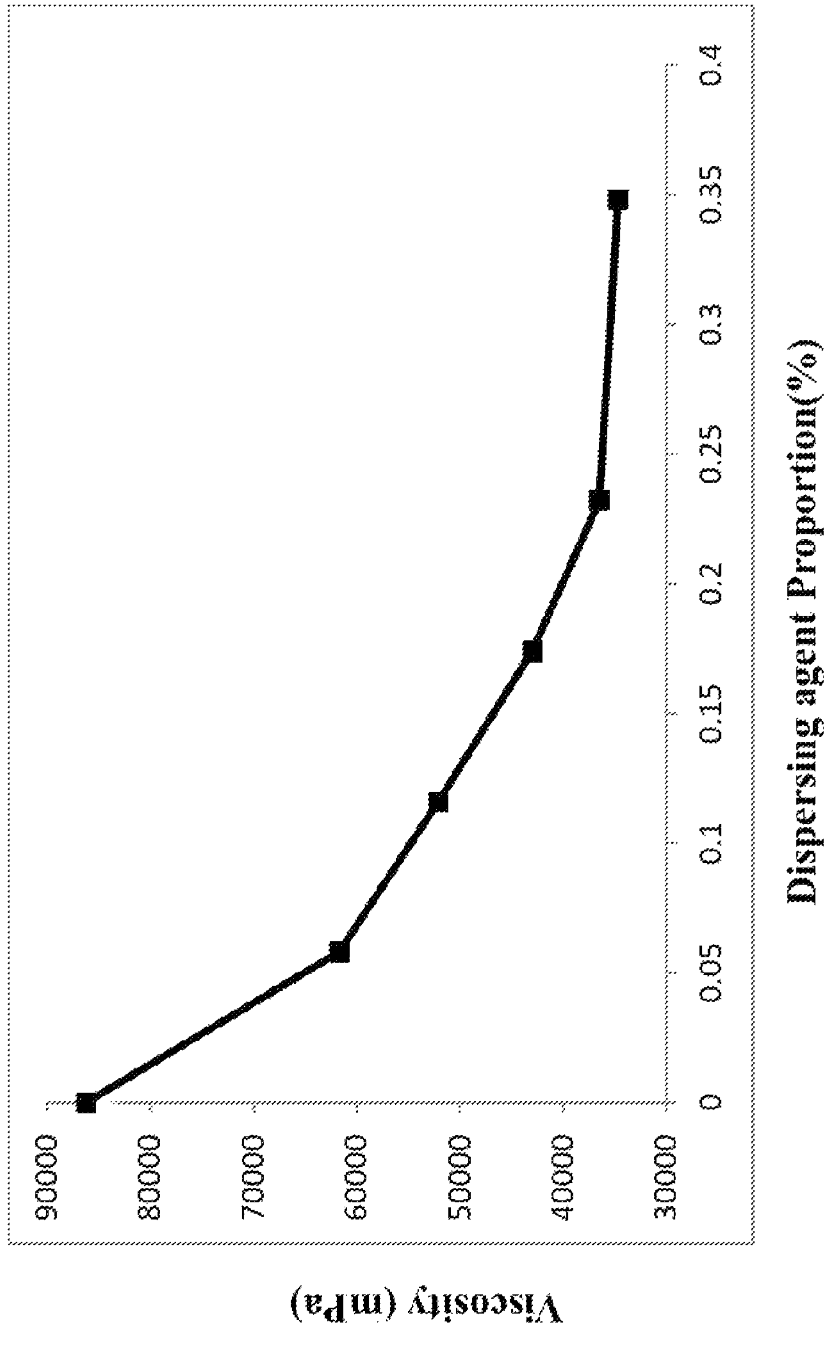
Viscosity (mPa)
90000
80000
70000
60000
50000
40000
30000
0
0.05
0.1
0.15
0.2
0.25
0.3
0.35
0.4
Dispersing agent Proportion(%)

DISPERSING AGENT FOR CATHODE SLURRY OF LITHIUM ION BATTERY AND PREPARATION METHOD AND APPLICATION THEREFOR

CROSS-REFERENCE TO RELATED APPLICATIONS

This application claims priority to Chinese Patent Application Ser. No. CN202210441969.7 filed on 26 Apr. 2022.

TECHNICAL FIELD

The present invention relates to the field of lithium ion batteries, and particularly to a dispersing agent for a cathode slurry of a lithium ion battery, and a preparation method and an application therefor.

BACKGROUND

In recent years, the new energy industry has developed rapidly, and compared with the traditional energy industry, the characteristics of safety, high efficiency and environmental protection have been supported by the state. The lithium ion battery industry is highly concerned. A lithium ion battery is composed of a cathode, an anode, a current collector, a diaphragm and an electrolyte. For a principle of the lithium ion battery, taking a lithium iron phosphate battery as an example, when the battery is charged: $LiFePO_4 \rightarrow Li1\text{-}xFePO_4 + xLi{+} + x^{e-}$, and when the battery is discharged: $Li1\text{-}xFePO_4 + xLi{+} + x^{e-} \rightarrow LiFePO_4$. In short, the working principle of the lithium ion battery refers to flowing of electrons between cathode and anode. When the cathode of the lithium ion battery is formed, a lithium iron phosphate slurry needs to be coated on an aluminum foil, so that a property of the lithium iron phosphate slurry is directly related to the coating of the cathode. At present, cathode slurries of most domestic lithium ion battery manufacturers are similar, and mainly composed of lithium iron phosphate powder, conductive carbon black, adhesive and NMP. During production, almost all enterprises may feed back the following questions:

- firstly, the lithium iron phosphate and the conductive carbon black in the cathode slurry of the lithium ion battery are not well dispersed in the NMP, and a surface is rough during coating;
- secondly, a solid content of the slurry is high, a viscosity of the cathode slurry is very high, a coating efficiency is low, and a coating effect is poor; and when the solid content of the slurry is low, a usage amount of the solvent (NMP) used in the production of the slurry is increased correspondingly, while the NMP, as a valuable solvent, leads to corresponding increases of a production cost, and subsequent use and recovery costs; and
- thirdly, there are problems of surface cracking and powder falling of the current collector after spraying and drying with the cathode slurry.

SUMMARY

Object of invention: in order to solve the technical problems in the prior art, the present invention provides a dispersing agent for a cathode slurry of a lithium ion battery, and a preparation method therefor, and aims to solve problems of poor solid dispersibility, low solid content, high slurry viscosity, low coating efficiency, and cracking and powder falling of a current collector in a cathode slurry of an existing lithium ion battery.

In order to achieve the object above, the present invention provides a dispersing agent for a cathode slurry of a lithium ion battery, which comprises the following ingredients in parts by weight: 50 parts to 80 parts of solvent, 5 parts to 9 parts of secondary assistant, 10 parts to 40 parts of main dispersing agent, and 0.1 part to 3 parts of pH value regulator.

The solvent is N-methylpyrrolidone (NMP).

The main dispersing agent is a polyester substance, and the polyester substance is any one or a combination of more of glycerol caprylate, polyglyceryl-3-polyricinoleate, polyglyceryl-4-oleate, polyglyceryl-10-laurate, polyglyceryl-10-myristate, polyglyceryl-2-stearate, polyglyceryl-3-palmitate and polyglyceryl-10-octanoate.

The secondary assistant is polyol, which is any one or a combination of more of triglycerol, decaglycerol, diglycerol, polyethylene glycol, glycerol, polymer polyol (POP) and polyvinylpyrrolidone.

The pH value regulator is any one or a combination of more of $H_3PO_4$, LiOH, $Na_2HPO_4$ and $NaH_2PO_4$.

The present invention further provides a preparation method for the dispersing agent for the cathode slurry of the lithium ion battery above, which comprises the following steps of:

- step 1): sequentially adding the solvent, the main dispersing agent and the assistant into a stirring tank according to a formula ratio, and stirring at a stirring speed of 40 rpm;
- step 2): after stirring uniformly, vacuumizing the stirring tank at a vacuum degree of 0.06 MPa to 0.08 MPa, circulating cooling water, stirring at a stirring speed of 80 rpm to 100 rpm, keeping a temperature in the tank at 80° C. to 150° C., stirring, and initially removing low-ingredient impurities and moisture in a mixed solution for 1 hour to 3 hours; wherein the reaction must be carried out at a fixed temperature, the reaction is slow and incomplete when the temperature is too low, and excessive polymerization occurs when the temperature is too high, leading to a low yield, energy consumption increase and unsafe factors in process control, so that an optimal reaction temperature ranges from 80° C. to 150° C., and meanwhile, with extension of test time, a material has a higher polymerization degree, a larger viscosity and a lower yield, so that a reaction time is subject to 3 hours; and
- step 3): venting to restore a normal pressure state of the mixed solution, stirring at a stirring speed of 30 rpm to 50 rpm, adding the pH value regulator, mixing uniformly, repeating the operation of the step 2), and then venting to obtain the dispersing agent.

The present invention further provides a cathode slurry of a lithium ion battery, which comprises the dispersing agent for the cathode slurry of the lithium ion battery above.

The cathode slurry of the lithium ion battery comprises the following ingredients in parts by weight: 94 parts to 97 parts of $LifePO_4$, 1 part to 3 parts of conductive carbon black, 1 part to 3 parts of polyvinylidene fluoride, 50 parts to 100 parts of N-methylpyrrolidone, and 0 part to 1.5 parts of dispersing agent for the cathode slurry of the lithium ion battery.

A $LiFePO_4$ is nanosized lithium iron phosphate.

Preferably, a conductive carbon black is an acetylene black material with a particle size of 45 nm, and a PVDF is a polyvinylidene fluoride material with a density of 1.77 g/cc.

Beneficial effects: compared with the prior art, according to the present invention, the dispersing agent is added into the cathode slurry of the lithium ion battery, so that a dispersity of a solid material in the cathode slurry is improved, and a viscosity of the slurry is reduced due to a good dispersity; when coating is carried out with the same viscosity, the cathode slurry added with the dispersing agent is used as a high-solid-content slurry, and multiple experiments show that, when a dispersing agent effective matter accounting for 0.3% of a total solid amount is added, a solid content is increased by 2% to 3% under the same viscosity; and in addition, after the dispersing agent is added, the dispersity is improved, a current collector is smoother after being dried, a cracking phenomenon on the current collector is greatly reduced, and a problem of powder falling is basically solved.

BRIEF DESCRIPTION OF THE DRAWINGS

FIG. shows a viscosity change curve of a cathode slurry prepared with a dispersing agent obtained in Embodiment 2 in a rotor of 6 rpm.

DETAILED DESCRIPTION

The present invention is further described in detail hereinafter with reference to specific embodiments, and the embodiments will help to understand the present invention, but the scope of protection of the present invention is not limited to the following embodiments.

Embodiment 1 Preparation of Dispersing Agent for Cathode Slurry of Lithium Ion Battery The dispersing agent for the cathode slurry of the lithium ion battery comprised the following ingredients by weight: 80 Kg of NMP, 5 Kg of mixture of decaglycerol and polyethylene glycol in a mass ratio of 1:1, 15 Kg of mixture of polyglyceryl-10-myristate and polyglyceryl-3-polyricinoleate in a mass ratio of 1:1, and 0.2 Kg of mixture of $Na_2HPO_4$ and $NaH_2PO_4$ in a mass ration of 1:1.

Preparation Method:

- in step 1), the NMP, the mixture of decaglycerol and polyethylene glycol, and the mixture of polyglyceryl-10-myristate and polyglyceryl-3-polyricinoleate were sequentially added into a stirring tank according to a formula ratio and stirred at 40 rpm, and the next step was carried out after ensuring uniform mixing through an observation hole;
- in step 2), the stirring tank was vacuumized at a vacuum degree of 0.06 MPa to 0.08 MPa, cooling water was circulated, a mixed solution was stirred at 85 rpm, a temperature in the tank was kept at 80° C., the mixed solution was stirred for a second time, and low-ingredient impurities and moisture in the mixed solution were initially removed;
- in step 3), venting was carried out to restore a normal pressure state of the mixed solution, the mixed solution was stirred at a low speed, the mixture of $Na_2HPO_4$ and $NaH_2PO_4$ was added and mixed uniformly, and then the operation of the step 2) was repeated; and
- in step 4), a sampling test was carried out after venting, wherein an appearance, a moisture, a pH value and a viscosity were mainly tested. Results were shown in Table 2.

Embodiment 2 Preparation of Dispersing Agent for Cathode Slurry of Lithium Ion Battery A preparation method was the same as that in Embodiment 1, except that a formula and a usage amount of the dispersing agent in the embodiment were as follows.

The dispersing agent for the cathode slurry of the lithium ion battery comprised the following ingredients by weight: 75 Kg of NMP, 5 Kg of mixture of decaglycerol and polyethylene glycol in a mass ratio of 1:1, 20 Kg of mixture of polyglyceryl-10-myristate and polyglyceryl-3-polyricinoleate in a mass ratio of 1:1, and 0.2 Kg of mixture of $Na_2HPO_4$ and $NaH_2PO_4$ in a mass ration of 1:1.

Embodiment 3 Preparation of Dispersing Agent for Cathode Slurry of Lithium Ion Battery A preparation method was the same as that in Embodiment 1, except that a formula and a usage amount of the dispersing agent in the embodiment were as follows:

The dispersing agent for the cathode slurry of the lithium ion battery comprised the following ingredients by weight: 70 Kg of NMP, 5 Kg of mixture of decaglycerol and polyethylene glycol in a mass ratio of 1:1, 25 Kg of mixture of polyglyceryl-10-myristate and polyglyceryl-3-polyricinoleate in a mass ratio of 1:1, and 0.2 Kg of mixture of $Na_2HPO_4$ and $NaH_2PO_4$ in a mass ration of 1:1.

Embodiment 4 Preparation of Dispersing Agent for Cathode Slurry of Lithium Ion Battery A preparation method was the same as that in Embodiment 1, except that a formula and a usage amount of the dispersing agent in the embodiment were as follows.

The dispersing agent for the cathode slurry of the lithium ion battery comprised the following ingredients by weight: 65 Kg of NMP, 5 Kg of mixture of decaglycerol and polyethylene glycol in a mass ratio of 1:1, 30 Kg of mixture of polyglyceryl-10-myristate and polyglyceryl-3-polyricinoleate in a mass ratio of 1:1, and 0.2 Kg of mixture of $Na_2HPO_4$ and $NaH_2PO_4$ in a mass ration of 1:1.

Embodiment 5 Preparation of Dispersing Agent for Cathode Slurry of Lithium Ion Battery A preparation method was the same as that in Embodiment 1, except that a formula and a usage amount of the dispersing agent in the embodiment were as follows.

The dispersing agent for the cathode slurry of the lithium ion battery comprised the following ingredients by weight: 60 Kg of NMP, 5 Kg of mixture of decaglycerol and polyethylene glycol in a mass ratio of 1:1, 35 Kg of mixture of polyglyceryl-10-myristate and polyglyceryl-3-polyricinoleate in a mass ratio of 1:1, and 0.2 Kg of mixture of $Na_2HPO_4$ and $NaH_2PO_4$ in a mass ration of 1:1.

Embodiment 6 Preparation of Dispersing Agent for Cathode Slurry of Lithium Ion Battery A preparation method was the same as that in Embodiment 1, except that a formula and a usage amount of the dispersing agent in the embodiment were as follows.

The dispersing agent for the cathode slurry of the lithium ion battery comprised the following ingredients by weight: 60 Kg of NMP, 5 Kg of decaglycerol, 35 Kg of polyglyceryl-10-myristate, and 0.2 Kg of $Na_2HPO_4$.

Embodiment 7 Preparation of Dispersing Agent for Cathode Slurry of Lithium Ion Battery A preparation method was the same as that in Embodiment 1, except that a formula and a usage amount of the dispersing agent in the embodiment were as follows.

The dispersing agent for the cathode slurry of the lithium ion battery comprised the following ingredients by weight: 60 Kg of NMP, 5 Kg of decaglycerol, 35 Kg of polyglyceryl-3-polyricinoleate, and 0.2 Kg of $Na_2HPO_4$.

In order to observe a change of material intuitively, weights of materials used in Embodiments 1 to 7 were summarized in Table 1, and test results of each case were summarized in Table 2:

TABLE 1

Use proportions of materials in Embodiments 1 to 7

| Code of material | 1#/Kg | 2#/Kg | 3#/Kg | 4#/Kg | 5#/Kg | 6#/Kg | 7#/Kg |
|---|---|---|---|---|---|---|---|
| Solvent | 80 | 75 | 70 | 65 | 60 | 60 | 60 |
| Assistant | 5 | 5 | 5 | 5 | 5 | 5 | 5 |
| Main dispersing agent | 15 | 20 | 25 | 30 | 35 | 35 | 35 |
| pH value regulator | 0.2 | 0.2 | 0.2 | 0.2 | 0.2 | 0.2 | 0.2 |

TABLE 2

Appearances, moistures, pH values and viscosities of Embodiments 1 to 7 (1# to 7#)

| Test item | 1# | 2# | 3# | 4# | 5# | 6# | 7# |
|---|---|---|---|---|---|---|---|
| Appearance | Pale yellow transparent liquid | Pale yellow transparent liquid | Pale yellow transparent liquid | Pale yellow transparent liquid | Pale yellow transparent liquid | Pale yellow transparent liquid | Pale yellow transparent liquid |
| Moisture/ppm | 542 | 468 | 510 | 375 | 497 | 383 | 442 |
| pH value | 7.5 | 7.1 | 6.9 | 6.6 | 6.3 | 6.5 | 6.5 |
| Viscosity/mPa · s | 723 | 1186 | 1754 | 2423 | 3111 | 3018 | 3254 |

As shown in Table 1 and Table 2, with the increase of the usage amount of the main dispersing agent (with a mass percentage of 10% to 40%), the pH value of the dispersing agent was slightly reduced, and the viscosity was increased. According to a demand of the cathode slurry of the battery, the viscosity of the dispersing agent should be moderate, and the pH value should be close to be neutral or alkaline. On the premise that the cases 1# to 7# above were all effective, the demand and the effect were balanced, and the case 2# was a preferred dispersing agent. Table 3 showed performance test methods of dispersing agents.

TABLE 3

Test methods of dispersing agents

| Test name | Test method | Equipment |
|---|---|---|
| Moisture | 0.5 g to 1.5 g of sample was taken by a dropper, dropwise added into a moisture analysor directly, and measured directly | SYD-2122D |
| pH value | 5% aqueous solution | PHS-3C |
| Viscosity | The dispersing agent was placed in a constant-temperature water bath at 25 °C for 1 hour, and measured by a 3# rotor at 12 rpm for 5 minutes | NDJ-5S |

The formula of the preferred Embodiment 2 was used as the dispersing agent, and an effect of the dispersing agent was verified according to a weight ratio that $LiFePO_4$: S-P: PVDF: NMP: dispersing agent=95:2.5:2.5:72.4: X. The proportions of the used materials and the test results of the cathode slurry were summarized in Table 4 and Table 5, the test methods were shown in Table 6, and the results were shown in FIG. 1.

TABLE 4

Verification of addition proportions of dispersing agent prepared in Embodiment 2 for preparing cathode slurry

| Experimental materials | 8#/g | 9#/g | 10#/g | 11#/g | 12#/g | 13#/g |
|---|---|---|---|---|---|---|
| nanosized lithium iron phosphate | 110.2 | 110.2 | 110.2 | 110.2 | 110.2 | 110.2 |
| Li2060 | 2.9 | 2.9 | 2.9 | 2.9 | 2.9 | 2.9 |
| FL2032 | 2.9 | 2.9 | 2.9 | 2.9 | 2.9 | 2.9 |
| NMP | 84 | 83.826 | 83.652 | 83.478 | 83.304 | 82.956 |
| Dispersing agent | — | 0.232 | 0.464 | 0.696 | 0.928 | 1.392 |

TABLE 5

Verification of test results of cathode slurry in case 2#

| Verification number | Moisture/ppm | Solid content/% | Viscosity/mPa · s |
|---|---|---|---|
| 8# | 1685.48 | 58.25 | 86226 |
| 9# | 794.38 | 58.06 | 61691 |
| 10# | 768.33 | 58.08 | 52093 |
| 11# | 841.63 | 58.06 | 42993 |
| 12# | 899.21 | 58.05 | 36504 |
| 13# | 1029.95 | 58.02 | 34680 |

TABLE 6

Test methods and equipment for cathode slurry

| Test name | Test method | Equipment |
|---|---|---|
| Moisture | 0.5 g to 1.5 g of sample was taken by a dropper, dropwise added into a moisture analysor directly, and measured directly | SYD-2122D |

TABLE 6-continued

Test methods and equipment for cathode slurry

| Test name | Test method | Equipment |
| --- | --- | --- |
| Solid content | 1 g of sample was taken, put into 50 mm tin foil paper, and dried at 120 °C for 4 hours | 101-00B |
| Viscosity | The dispersing agent was placed in a constant-temperature water bath at 25 °C for 1 hour, and measured by a 4# rotor at 6 rpm for 2 minutes | NDJ-5S |

As could be seen from Table 5 and FIG. 1, the viscosity of the slurry was greatly reduced by adding the dispersing agent, the effective ingredients of the dispersing agent (excluding the solvent NMP) accounted for 0.2% to 0.3%, and the effect tended to be reduced. When the effective ingredients of the added dispersing agent accounted for 0.3% of a total solid mass, the viscosity of the cathode slurry was reduced by 59.78%, and such great viscosity reduction proved that the dispersing agent had a good improvement on a solid dispersibility. Under the same solid content, the low-viscosity slurry referred to the improvement of the coating efficiency.

The present invention provides a preparation idea and method for a dispersing agent for a cathode slurry of a lithium ion battery. There are many methods and ways to realize the technical solution, and the above are only the preferred embodiments of the present invention. It should be pointed out that, for those of ordinary skills in the art, several improvements and decorations may be made without departing from the principle of the present invention, and these improvements and decorations should also be regarded as falling within the scope of protection of the present invention. All the unspecified components in the embodiments can be realized by the prior art.

What is claimed is:

1. A dispersing agent for a cathode slurry of a lithium ion battery, comprising the following ingredients in parts by weight: 50 parts to 80 parts of solvent, 5 parts to 9 parts of secondary assistant, 10 parts to 40 parts of main dispersing agent, and 0.1 part to 3 parts of pH value regulator;

wherein the main dispersing agent is a polyester substance, and the polyester substance is any one or a combination of one or more of glycerol caprylate, polyglyceryl-3-polyricinoleate, polyglyceryl-4-oleate, polyglyceryl-10-laurate, polyglyceryl-10-myristate, polyglyceryl-2-stearate, polyglyceryl-3-palmitate and polyglyceryl-10-octanoate.

2. The dispersing agent for the cathode slurry of the lithium ion battery according to claim 1, wherein the solvent is N-methylpyrrolidone (NMP).

3. The dispersing agent for the cathode slurry of the lithium ion battery according to claim 1, wherein the secondary assistant is polyol, which is any one or a combination of more of triglycerol, decaglycerol, diglycerol, polyethylene glycol, glycerol, polymer polyol (POP) and polyvinylpyrrolidone.

4. The dispersing agent for the cathode slurry of the lithium ion battery according to claim 1, wherein the pH value regulator is any one or a combination of more of $H_3PO_4$, LiOH, $Na_2HPO_4$ and $NaH_2PO_4$.

5. A cathode slurry of a lithium ion battery, comprising the dispersing agent for the cathode slurry of the lithium ion battery according to claim 1.

6. The cathode slurry of the lithium ion battery according to claim 5, comprising the following ingredients in parts by weight: 94 parts to 97 parts of $LifePO_4$, 1 part to 3 parts of conductive carbon black, 1 part to 3 parts of polyvinylidene fluoride (PVDF), 50 parts to 100 parts of N-methylpyrrolidone, and 0.10 part to 1.5 parts of dispersing agent for the cathode slurry of the lithium ion battery.

7. The cathode slurry of the lithium ion battery according to claim 6, wherein the $LifePO_4$ is nanosized lithium iron phosphate.

8. The cathode slurry of the lithium ion battery according to claim 6, wherein the conductive carbon black is an acetylene black material with a particle size of 45 nm, and the PVDF is a polyvinylidene fluoride material with a density of 1.77 g/cc.

* * * * *